United States Patent
Rudolf et al.

(10) Patent No.: US 8,393,408 B2
(45) Date of Patent: Mar. 12, 2013

(54) POWER TOOL WITH OPTICAL CONTROL

(75) Inventors: Boris Rudolf, Stuttgart (DE); Sigmund Braun, Kusterdingen (DE); Christof Kress, Deizisau (DE)

(73) Assignee: C. & E. Fein GmbH (DE)

( * ) Notice: Subject to any disclaimer, the term of this patent is extended or adjusted under 35 U.S.C. 154(b) by 0 days.

(21) Appl. No.: 12/772,775

(22) Filed: May 3, 2010

(65) Prior Publication Data

US 2010/0206597 A1    Aug. 19, 2010

Related U.S. Application Data

(62) Division of application No. 10/214,844, filed on Aug. 8, 2002, now abandoned.

(30) Foreign Application Priority Data

Aug. 16, 2001  (DE) .................................. 101 41 161

(51) Int. Cl.
*B23Q 5/02* (2006.01)

(52) U.S. Cl. ............ 173/2; 173/170; 173/171; 385/140; 385/16; 385/17; 385/18; 385/19; 359/139; 264/250; 264/260; 264/265

(58) Field of Classification Search .............. 173/2, 170, 173/171; 385/16–19, 140; 359/139; 264/250, 264/260, 265
See application file for complete search history.

(56) References Cited

U.S. PATENT DOCUMENTS

| | | | |
|---|---|---|---|
| 4,233,493 A | 11/1980 | Nath | |
| 4,385,344 A | 5/1983 | Gonser | |
| 4,519,780 A | 5/1985 | Strohmaier et al. | |
| 4,591,712 A | 5/1986 | Thalmann | |
| 4,826,431 A | 5/1989 | Fujimura et al. | |
| 4,836,636 A | 6/1989 | Obara et al. | |
| 5,268,741 A | 12/1993 | Chou et al. | |
| 5,324,283 A | 6/1994 | Heckele | |
| 5,324,932 A | 6/1994 | Niewisch | |
| 5,387,803 A | 2/1995 | Kurtz et al. | |
| 5,420,416 A | 5/1995 | Iida et al. | |
| 5,569,893 A * | 10/1996 | Seymour ................... | 200/61.54 |
| 6,014,478 A | 1/2000 | Spaeth | |
| 6,571,049 B1 | 5/2003 | Nath | |
| 6,810,163 B2 | 10/2004 | Saito | |
| 6,860,879 B2 | 3/2005 | Irion et al. | |
| 6,878,145 B2 | 4/2005 | Brugger et al. | |
| 7,086,111 B2 | 8/2006 | Hilscher et al. | |

FOREIGN PATENT DOCUMENTS

| | | |
|---|---|---|
| DE | 7129942 U | 12/1971 |
| DE | 2432421 A1 | 1/1976 |
| DE | 2617460 A1 | 11/1977 |
| DE | 3304794 A1 | 9/1983 |
| DE | 8905298 U1 | 6/1989 |
| DE | 4204057 A1 | 8/1993 |
| DE | 4309049 A1 | 9/1994 |

(Continued)

*Primary Examiner* — Brian D Nash
*Assistant Examiner* — Michelle Lopez
(74) *Attorney, Agent, or Firm* — St. Onge Steward Johnston & Reens LLC

(57) ABSTRACT

An optical control is disclosed which is particularly suitable for application as a switching device, regulating device or sensor device for a power tool. At least two optical waveguides are provided one of which being configured as a transmitting waveguide is coupled to a light source, a second one of which being configured as a receiving waveguide cooperating therewith is coupled to an evaluation circuitry. Both waveguides cooperate with a control element that is movable at least between two positions in which light signals of different magnitude are transmitted from the transmitting waveguide into the receiving waveguide.

21 Claims, 10 Drawing Sheets

FOREIGN PATENT DOCUMENTS

| | | |
|---|---|---|
| DE | 19549384 A1 | 1/1997 |
| DE | 19934186 A1 | 1/2001 |
| EP | 0126253 A1 | 11/1984 |
| GB | 1495808 A | 12/1977 |
| JP | 57-163205 * | 7/1982 |
| JP | 62-271681 * | 11/1987 |
| JP | 62271681 A | 11/1987 |
| WO | WO 99/66831 * | 12/1999 |

* cited by examiner

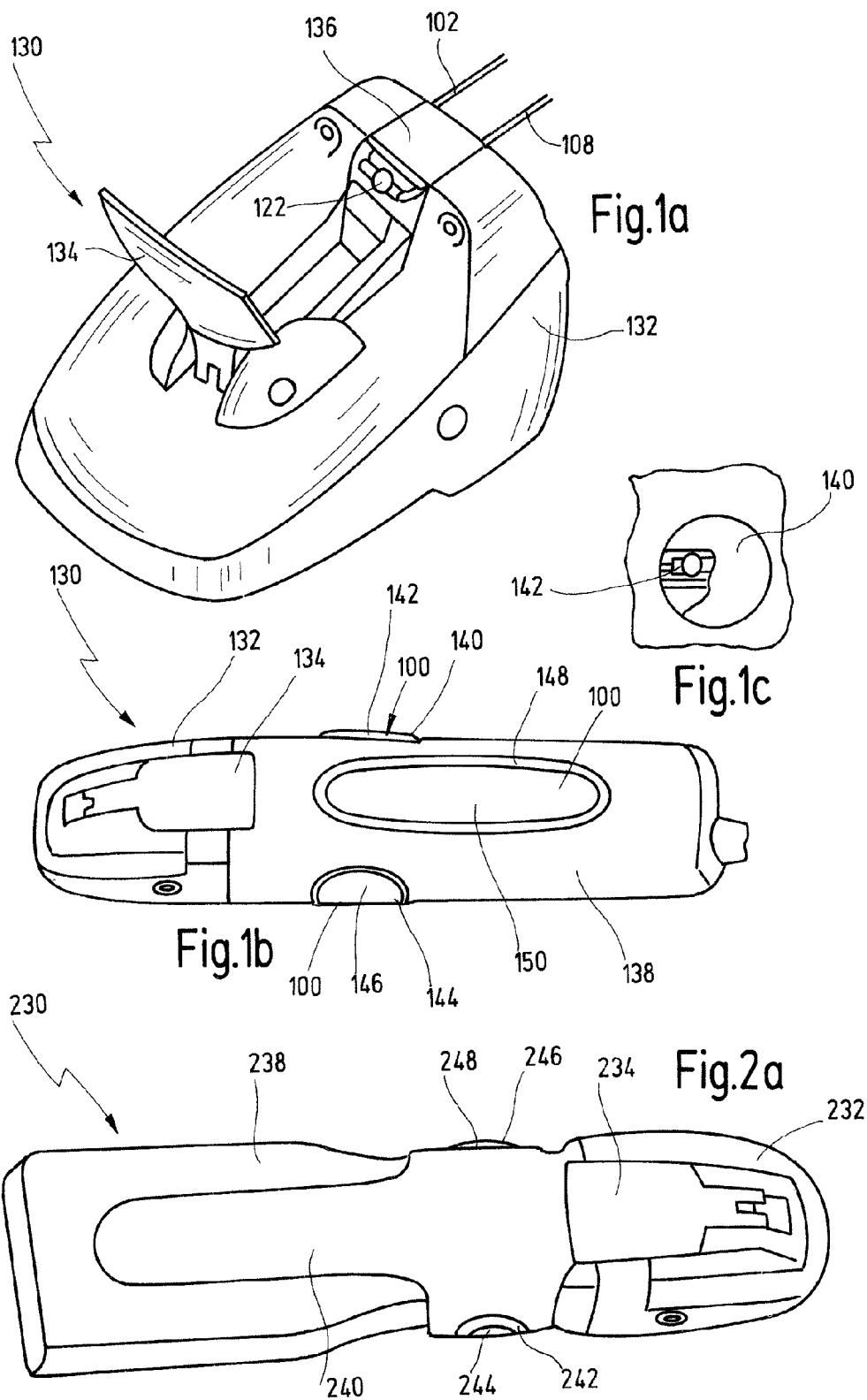

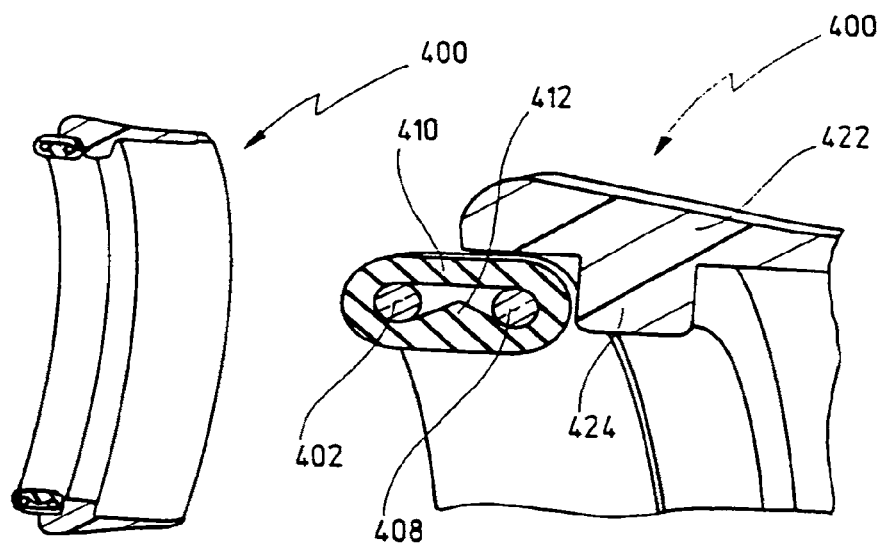
Fig.4
Fig.4a
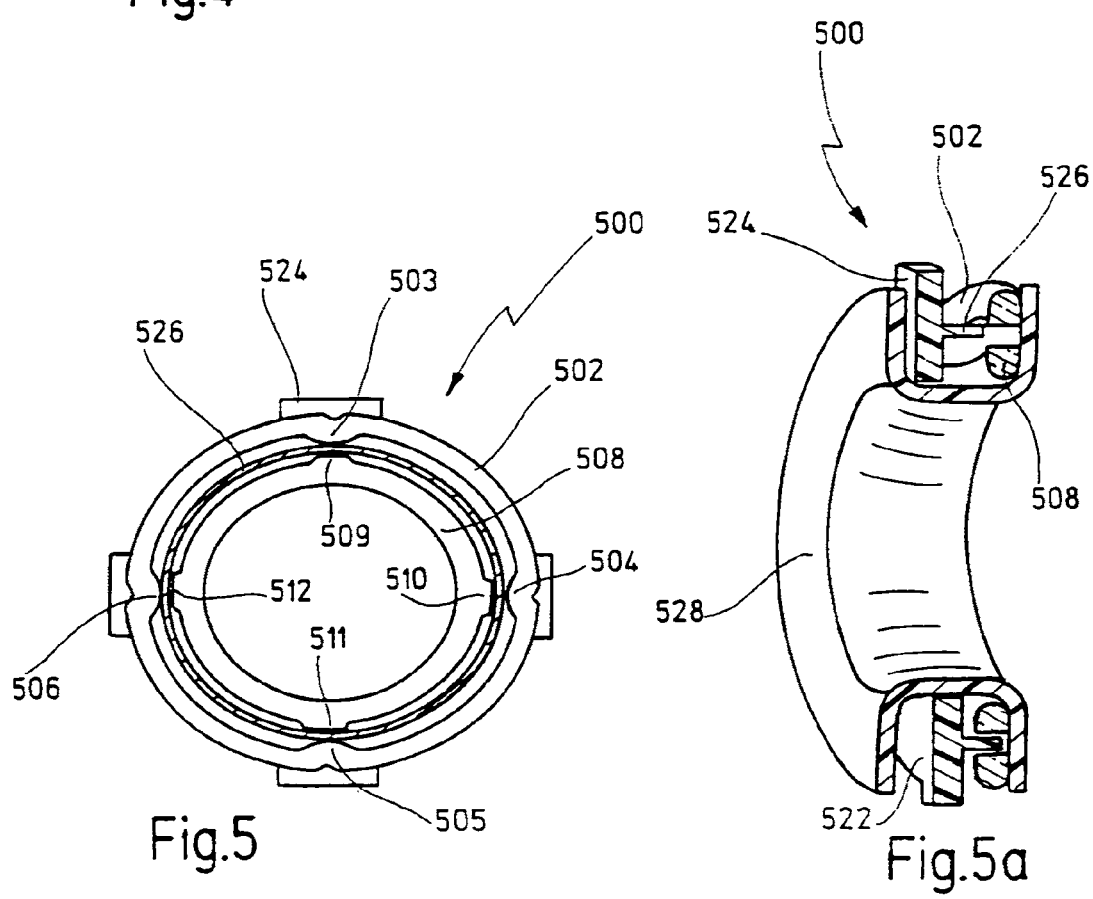
Fig.5
Fig.5a

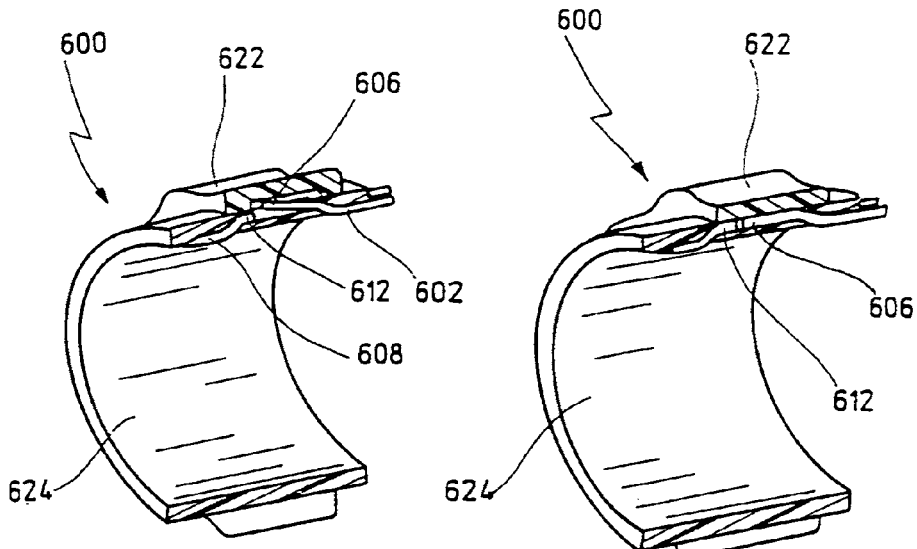
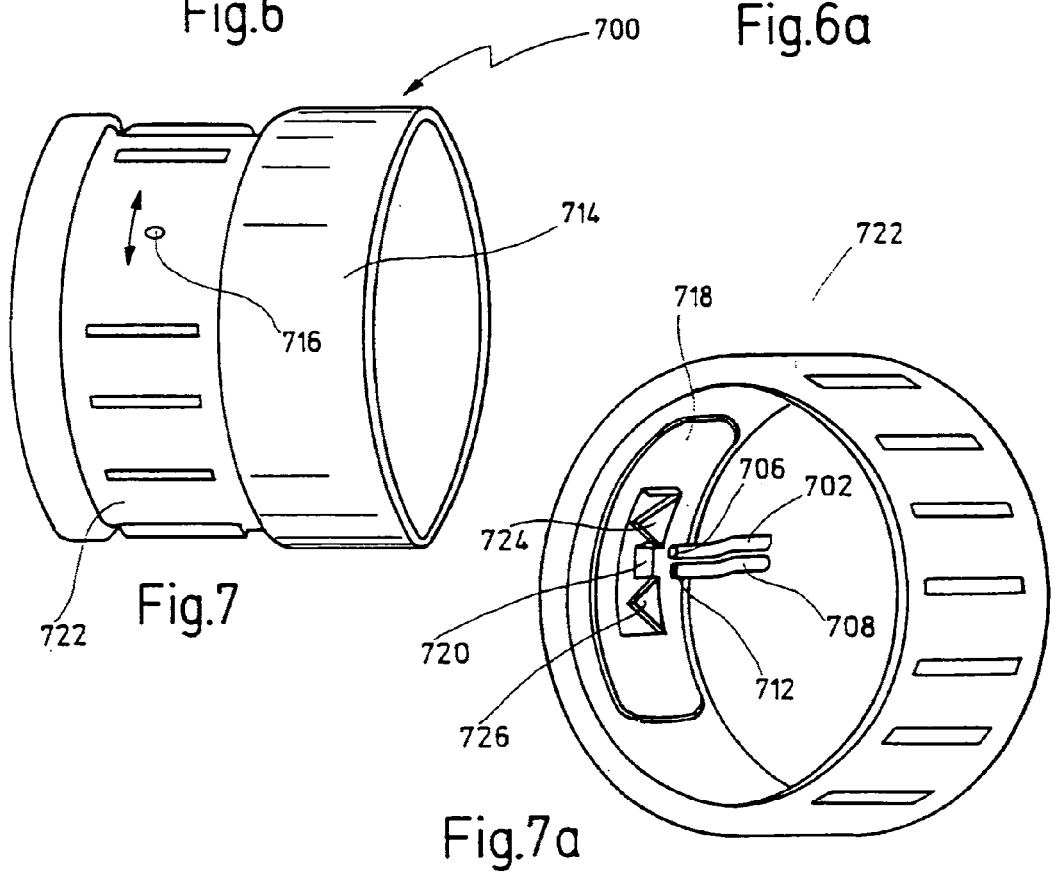

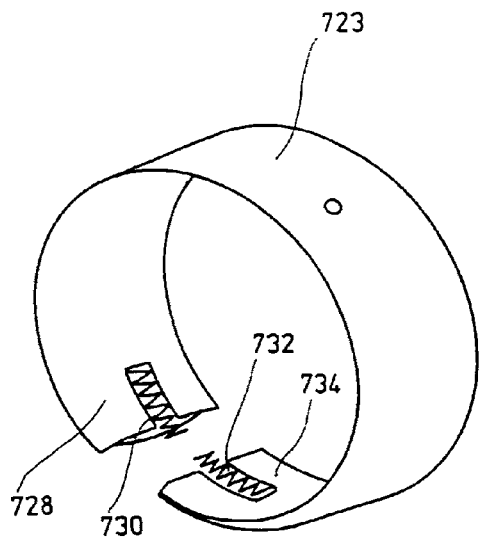
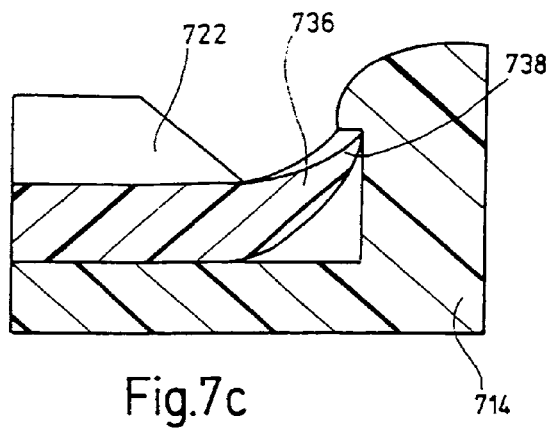
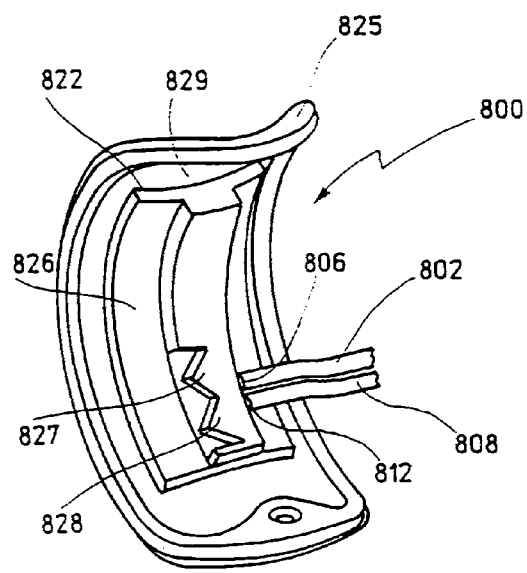
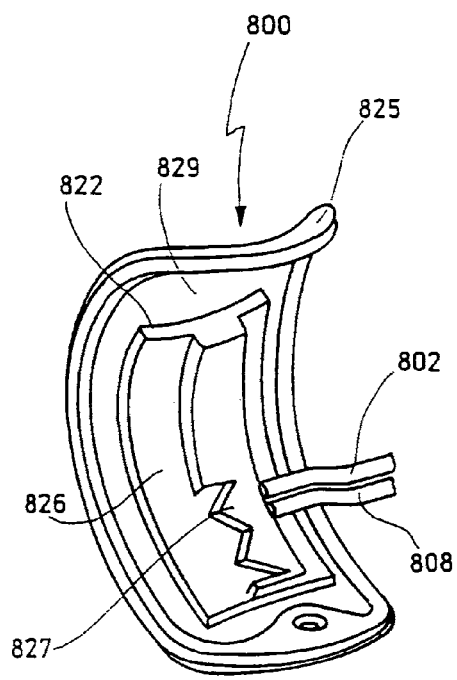
Fig.7b
Fig.7c
Fig.8
Fig.8a

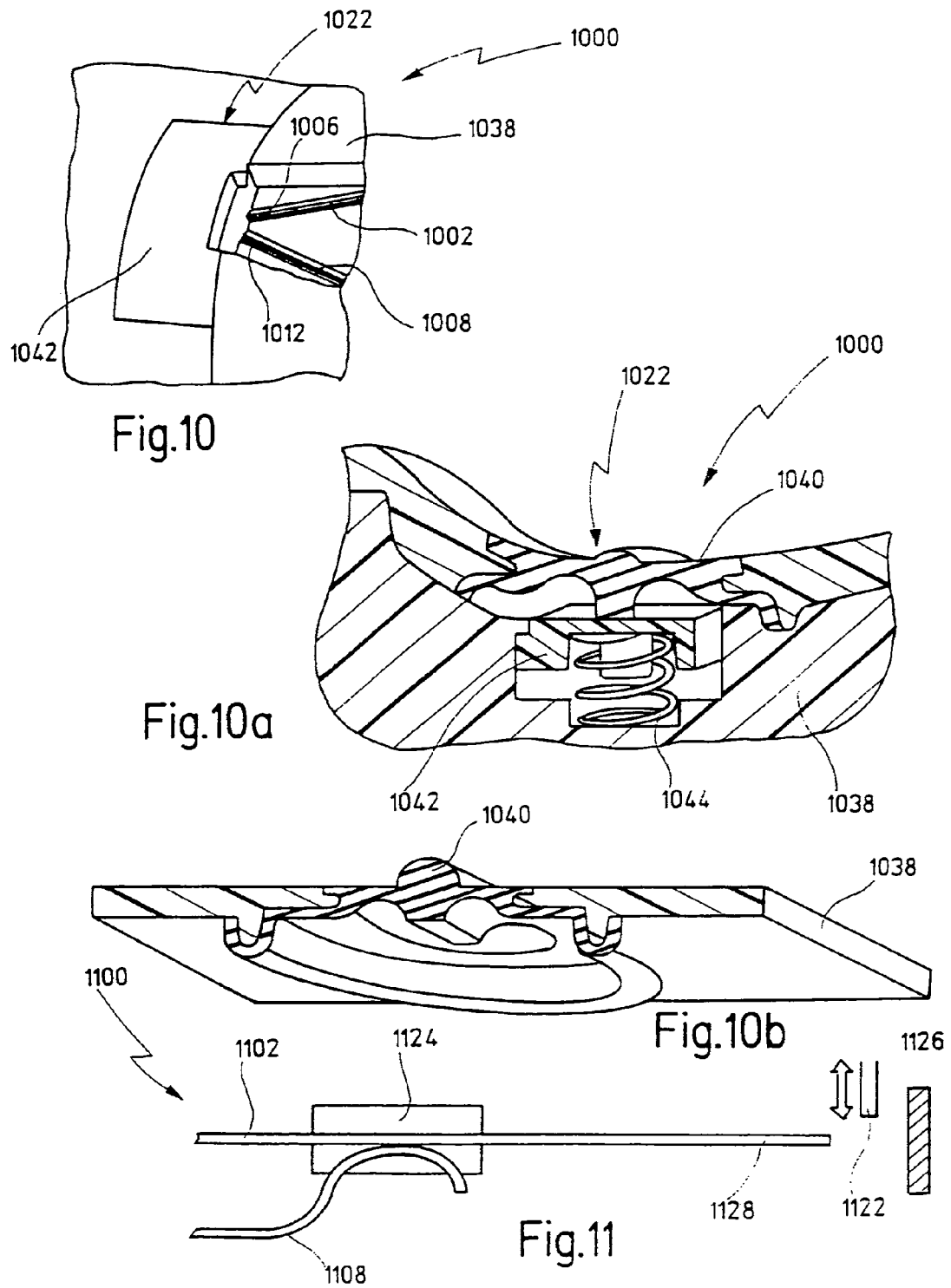

POWER TOOL WITH OPTICAL CONTROL

CROSS-REFERENCE TO RELATED APPLICATIONS

The present application is a divisional of pending U.S. patent application Ser. No. 10/214,844, filed on Aug. 8, 2002, now abandoned which claims priority from German Patent Application No. 101 41 161.8, filed on Aug. 16, 2001. All prior applications are herein incorporated by reference.

FIELD OF THE INVENTION

The invention relates to a power tool comprising an optical control which may, in particular, be configured as a switch, a controller or a sensor.

BACKGROUND OF THE INVENTION

In power tools a variety of switches and electrical controls is used which may be commonly configured as non-locking keys, press keys, slide switches, toggles or the like.

The configuration and location of such switches or electrical controls cannot be chosen solely under ergonomic considerations, but must, in particular, when the housing is made from metal, follow the necessary protective regulations, whereby design and assembly of the respective power tool is complicated to a large extent.

From EP 0 126 253 A1 a screw driver has become known which utilizes a light barrier fixed to the housing which allows to sense a pot-like stop having axially extending trapezoid teeth, to thereby sense, by means of the shifting of the stop, the diameter of the tool used, to thereby control a speed regulator for the motor of the screw driver, depending on the diameter sensed.

However, this light barrier, which may also be replaced by a Hall-barrier, is coupled to an evaluation circuitry by means of an electric wire. Thus, still an electric wire connection is necessary.

SUMMARY OF THE INVENTION

In view of this it is a first object of the invention to provide an improved power tool having a control device that may be integrated into the housing thereof without the requirement of electric wire connections.

It is a further object of the invention to provide a power tool comprising an optical control device.

It is a further object of the invention to disclose a power tool comprising an optical control that may, in particular, be configured as a switching device, a regulation device or a sensor device.

It is another object of the invention to disclose a power tool comprising a control device allowing integration into the housing of the power tool at any desired location, due to mainly ergonomic considerations, without requiring particular insulation steps when utilizing metal housing parts.

It is a further object of the invention to disclose a power tool having an improved ergonomic design.

It is another object of the invention to provide a power tool that can easily be operated by means of control devices in a particular simple and reliable way.

It is another object of the invention to provide an optical control device having a broad range of possible applications, allowing an integration into power tools or into any other devices such as house hold appliances or the like.

These and other objects of the invention are solved by a power tool comprising a light optical control device, in particular a switching device, regulation device or sensor device having at least two optical waveguides, at least a first one of which being configured as a transmitting waveguide is coupled to a light source and cooperates with a second waveguide being configured as a receiving waveguide that is coupled with an evaluation circuitry, wherein the two waveguides are coupled to a control element that is movable between at least two positions within which light signals of different magnitudes are input from the transmitting waveguide into the receiving waveguide.

Thus, the object of the invention is solved in a surprisingly simple manner, namely, by utilizing two optical waveguides and a control element which allows to control the input of light signals into the receiving waveguide. Since the waveguides, which may be designed as flexible guides, can be integrated within the housing or even in a suitable manner on the outer surface of the housing almost in any desired way, thereby switching devices, control devices or sensor devices for a power tool can be effected that can be tailored to the respective individual needs, without requiring large space.

According to an alternative embodiment of the invention the object of the invention is solved by a power tool comprising a control device, in particular a switching device, regulation device or sensor device having an optical waveguide into which light can be input from a light source, wherein an evaluation circuitry is coupled to the waveguide by means of which light irradiation emerging from one end of the waveguide and redirected into the waveguide via a redirecting means is evaluated, wherein the end is coupled to a control element by means of which the irradiation coupled back into the waveguide is controllable.

Also in this way the object of the invention is solved completely. By contrast to the embodiment mentioned before, instead of one transmitting waveguide and one receiving waveguide only a single optical waveguide is utilized for transmitting and receiving light signals, wherein the light emerging from the optical waveguide at one end is input again and the intensity of this light is evaluated.

Naturally, also the control element itself may be designed as a redirecting means.

The power tool and the control device according to the invention may be modified in various forms and may be subject to various applications.

In case the evaluation circuitry does not only differentiate between two states, and the intensity of the light signals coupled into the receiving waveguide is evaluated, the control device can also be designed as a continuous controller.

It should be noted that the term "optical waveguide" shall not be understood to limit this to a waveguide utilized only for visible light. By contrast, under the scope of this invention "optical waveguide" shall include any waveguide that is suitable to transport electromagnetic irradiation within the region of visible light, infrared light, ultraviolet light or any other regions adjacent thereto.

According to an advantageous development of the invention the transmitting waveguide and the receiving waveguide at least in the region of the control element are received in a unit protected against the outside at least against dust.

In this way the control device can also be utilized under rough operating conditions to which power tools are often subjected.

According to an additional embodiment of the invention the transmitting waveguide at a first end thereof is coupled with the light source, while the receiving waveguide at a first end thereof is coupled with the evaluation circuitry, wherein a second end of the transmitting waveguide is arranged at a distance from a second end of the receiving waveguide.

Now the input of the light signals emitted by the transmitting waveguide into the second end of the receiving waveguide can be influenced in various ways.

Thereby light optical switches with different defined switching states can be realized, as well as non-locking keys, sliding switches and rotary switches.

According to an improvement of the aforementioned embodiment the control device is designed as an elastic form part surrounding the second ends of the waveguides.

This has the advantage that the control element itself as well as the second ends of the waveguides are protected against influences from the environment in a robust and reliable way. The control element may, e.g., be configured as a rubber part.

Herein the elastic form part is preferably configured as a sleeve that is elastically deformable in the region between the second ends for blocking the light signals input into the receiving waveguide. To this end a thickening may be provided in the region between the second ends.

In this way a control device of particularly simple and robust design is realized.

According to an additional embodiment of the invention the second ends of the waveguides are aligned with each other for transmitting light signals into the receiving waveguide, wherein the control element is configured for moving the second ends relative to each other.

Also with such a design a particularly simple switch, controller or sensor can be effected.

According to another embodiment of the invention the second ends of the waveguides are aligned with each other for inputting light signals into the receiving waveguides, wherein the control element comprises a portion that is movable into the space between the two ends.

According to an improvement of this embodiment the control element is configured as a spring element, the portion of which that is movable into the space between the second ends comprising a light passing opening.

With such a design a non-locking key can be realized in a particularly simple way, since the restoring force can be effected readily by the spring element itself.

According to an advantageous development of the invention the control element is covered by an elastic touch pad.

This has the advantage that by means of the elastic touch pad a protection of the control element and of the waveguides against environmental influences can be effected, whereby an embodiment sealed against dust or even against liquid can be reached. Since the touch pad is configured elastically, the control element can be operated through the touch pad. If desired, also the resilience of the touch pad can be utilized for effecting a restoring force for the control element at the same time. Thereby, the control device can be designed relatively thin, requiring only small space.

According to a further development of the invention the control element is designed as a slider which is slidable between an idle position in which the second ends of the waveguides are not aligned with each other, and between an operative position in which the second ends are aligned with each other for transmitting light signals into the receiving waveguide.

Thus a light optical slide switch or non-locking key switch can be effected.

Herein the slider is lockable preferably in the operative position and is biased toward the idle position.

According to another embodiment of the invention at least one of the second ends is biased by a spring element or by its self-tension into a direction substantially transversely to its direction of extension, wherein the control element allows to move the second end laterally between the idle position and the operative position.

In this way a particularly simple design is effected.

According to an advantageous development of the invention the slider is covered by an elastic touch pad to which it is firmly connected and by which it is elastically biased into the idle position or vice versa by the material tension of the touch pad, if desired.

In this way an ergonomically particularly advantageous slide switch can be effected, since by means of a locking in the operative position an operation free of tiring is made possible at small power requirement. By means of the bias into the direction of the idle position the slide switch is restored again, when released.

By linking the slider to an elastic touch pad lying thereabove, the bias into the direction of the idle position can be effected in a particularly simple way, while at the same time an encapsulation of the control device against environmental influences is effected, since the touch pad may, for instance, be made from rubber, a silicone material or the like.

According to a further embodiment of the invention the transmitting waveguide comprises at least one light emitting opening for radial emission which is coupled to a light receiving opening of the receiving waveguide.

With such a design additional applications of the control device are made possible. In particular, annular or partially annular control elements are made possible.

According to an improvement of this design, the transmitting waveguide and the receiving waveguide are at least partially configured as annular waveguides that are held at a distance, wherein the control element is configured as a switching ring by means of which the transmitting waveguide and the receiving waveguide are movable with respect to each other.

With such a design a switch that is actuable from all sides can be realized.

Herein the transmitting and the receiving waveguides can be held within an annular tube at a distance from each other, wherein a transmission of light into the receiving waveguide is impeded in an idle position, and wherein the switching ring is movable relative to the tube and allows to deform the tube for inputting light rays into the receiving waveguide.

In this way a switch having an annular control element can be effected in a particularly simple way, while the resilience of the tube can be utilized for effecting a restoring force.

According to an additional embodiment of the invention the transmitting and the receiving waveguides are at least partially configured as annular waveguides that are held at a distance from each other, wherein the control element is configured as a switching ring that allows to input light rays into the receiving waveguide at least at one selected location when being in the operative position.

With such a design a ring switch can be effected allowing actuation at selected locations.

According to another embodiment of the invention the control element is configured as a rotary slide being coupled with one of the second ends of its waveguides for moving same between both positions.

In this way a rotary switch can be effected in a particularly simple way. Herein the control element may, for instance, be configured as a switching ring that is rotatable between an idle position and an operative position.

According to another embodiment of the invention the second ends of the waveguides are arranged misaligned with respect to each other, wherein the control element comprises means for inputting the light signals emitted by the transmitting waveguide into the receiving waveguide in at least one of the positions of the control element.

With such a design additional application requirements with respect to the control device can be reached, in particular, annular or partially annular control elements can be effected that are rotatable between several switching positions.

The means for inputting the light may, for instance, comprise a prism, a reflecting surface or any other redirecting element that is movable into a position for transmitting light signals from the transmitting waveguide to the receiving waveguide.

In addition, the second ends, when being in the idle position, may be coupled to an additional redirecting means, which may also be configured as a prism, for redirecting light signals emitted by the transmitting waveguide onto an optical display.

In this way the light signals emitted by the transmitting waveguide can be utilized for optically signaling the idle position of the switch.

According to an advantageous development of the aforementioned embodiments the control element may comprise a rotary switch upon which the means for inputting and/or the redirecting element are received.

Herein the rotary switch may be designed as a switching ring which is biased into the direction of an idle position.

In addition, the switching ring may be elastically biased into a middle position in which light signals from the transmitting waveguide are redirected by the redirecting element toward a display surface for optically signaling the idle position.

In addition, the switching ring may be movable also from the idle position in a first direction of rotation into a first operative position in which light signals are input into the receiving waveguide, and in a second direction of rotation, into a second operative position in which also light signals are input into the receiving waveguide.

In this way an annular switch can be effected having a middle idle position which is optically signaled, as well as two operative positions which may be reached by rotating into one or into another direction of rotation.

According to an additional embodiment of the invention the rotary slide comprises an elastic touch pad that is received circumferentially in a housing opening, wherein the means for inputting the light rays into the receiving waveguide and/or the redirecting means are received on the elastic touch pad.

In this way a rotary switch can be effected particularly simple.

Herein the resilience of the touch pad may be utilized for elastically biasing the control element into the direction of an idle position or vice versa.

Again, the touch pad may be utilized simultaneously to protect or to completely seal the waveguides and the control element against environmental influences.

According to another embodiment of the invention the means for inputting may comprise a mirror element that is movable into a position for transmitting light rays from the transmitting waveguide into the receiving waveguide.

Thereby additional requirements with respect to the control device may be met. In particular, by means of particularly sensing the light signals received by the receiving waveguide a regulating device can be effected.

According to a preferred development of this embodiment the mirror element may comprise a spring element that is clamped at one end thereof and that holds a mirror element at another end thereof and that may be moved against the action of the spring force.

In this way by means of the spring element simultaneously a restoring force can be effected for biasing the control element, e.g. into an idle position.

Herein the mirror surface may be continuously pivotable between a position in which no light signals are input into the receiving waveguide, and between a position in which light emerging from the transmitting waveguide is input almost completely into the receiving waveguide.

In this way a continuous sensing of the light signals received by the receiving waveguide and, thus, a continuous controller can be effected.

Herein the spring element may rest against a touch pad by means of which the spring element is activatable.

In this way a non-locking key can be realized that can be used either for switching on/off and/or for continuous control, in particular with regard to a power tool having a housing in pistol form, e.g. for activating the motor and for controlling the speed thereof.

According to a further development of the invention a power tool comprises at least one activation part or attachment part that is coupled to a control device of the kind explained above.

In this way various switching regulating or control functions may be reached in a particularly advantageous way.

For instance, power tools having a supplemental handle, such as a stock handle, may be monitored by means of the control device for ensuring that the operator has gripped the stock handle, thus ensuring a two-handed operation (i.e. activation of the drive only upon simultaneous gripping of another gripping part and activation of an additional switch). In this way, for instance, an optically controlled two-handed angle grinder can be designed. In addition, such a control device can be utilized for instance, to monitor whether a particular attachment part is located on the power tool or not. Thus, for instance, a starting of an angle grinder can be avoided in case the required protection hood is not provided.

In addition, it may be monitored, whether an activation part, for instance, a clamping lever is located in a particular required position. Finally also particular attachment parts or accessory parts which are suitable only for utilization with a particular power tool, can be coded by means of the control device. Thus it may be ensured, for instance, that a particular protection hood is mounted on a particular angle grinder, while in all other cases a starting of the angle grinder is avoided by means of the control device.

A power tool having a clamping lever for clamping a tool that is movable between a clamping position and a loose position, may be controlled, as to whether the clamping lever is in the clamping position, by means of a control device assigned to the clamping lever. The control device may be configured such that both ends of the waveguides may be enclosed by an elastic sleeve having a thickening in the region between both ends and being elastically deformable for blocking light signals transmitted into the receiving waveguide.

Such a control device can be integrated in a simple way into the gear head of a power tool in such a way that the clamping lever activates the control device when being in the clamping position.

Herein the control device may, in particular, be configured as a switch allowing an activation of the motor only when the clamping lever is in the clamping position.

According to an additional embodiment of the invention at least one of the waveguides is integrated into a housing wall.

Herein the waveguide may be located directly within the housing wall or on the outer side or the inner side thereof.

In each case thereby the total size of the power tool may be reduced effectively.

According to an additional embodiment of the invention the housing of a power tool may be bonded to a touch pad of the control device by means of two-component-technology.

By means of this "two-component-molding-technology" an intimate bonding between a softer elastic material and another plastic material can be effected. Thus, for instance, a rubber touch pad or a silicone touch pad may be effectively bonded to the remaining (hard) housing part (to this end, firstly one of the two materials is injected into a mold, thereafter the other material is injected into the mold, while the first material is still in a partially soft state, thereby effecting a good bonding between the materials). In this way an additional sealing of the touch pad or of the control device, respectively, against environmental influences from the outside or against contamination from the inside can be effected.

In addition, the elasticity of the touch pad may be utilized for effecting a restoring force for the switch or for the non-locking key, respectively.

Needless to say, the features of the invention mentioned before may not only be utilized in the combination given, but also in any other combination or on its own without leaving the scope of the invention.

BRIEF DESCRIPTION OF THE DRAWINGS

Additional features and advantages of the invention result from the following description of preferred embodiments with reference to the drawing. In the drawings:

FIG. 1a shows a power tool having a control device according to FIG. 1, wherein only the gear head of the power tool is shown in perspective view;

FIG. 1b shows a complete view of the power tool according to FIG. 1a;

FIG. 1c shows a detailed view of a switch according to FIG. 1b;

FIG. 2a shows a power tool having two control devices according to FIG. 2, shown in perspective, simplified representation;

FIG. 4 shows an additional embodiment of the control device according to the invention comprising a switching ring, shown in cross-section;

FIG. 4a shows an enlarged cut-out of the switching ring together with a profile tube assigned thereto according to FIG. 4;

FIG. 5 shows a representation of another control device according to the invention comprising annular waveguides which allow to block light input into the receiving waveguide at four locations by means of an annular control element;

FIG. 5a shows a cross-section of the control device according to FIG. 5;

FIG. 6 shows another embodiment of the control device according to the invention having an annular control element, shown in cross-section in an idle position;

FIG. 6a shows the control device according to FIG. 6 in an operative position;

FIG. 7 shows another embodiment of the control device according to the invention in perspective view;

FIG. 7a shows a perspective view of the control element according to FIG. 7;

FIG. 7b shows a perspective view of a metal ring for making the switching ring according to FIG. 7a, with mounted spring elements, depicted schematically;

FIG. 7c shows an enlarged detailed section through the rim of the switching ring according to FIG. 7, in the region of a sealing to the housing;

FIG. 8 shows a further embodiment of a control device according to the invention configured for mounting into a respective opening of a housing, shown in perspective view seen from the inside;

FIG. 8a shows the control device according to FIG. 8 in an activated position;

FIG. 10 shows a modification of the control device according to FIG. 9 in schematic, enlarged representation, in which, in particular, the both ends of the waveguides and a reflection element assigned thereto can be seen;

FIG. 10a shows a section through the control device according to FIG. 10 in the region of the movable reflection surface;

FIG. 10b shows an enlarged representation of the touch pad according to FIG. 10a;

FIG. 11 shows a schematic representation of an alternative embodiment of the invention and FIG. 12 shows a modification of the embodiment according to FIG. 11 in schematic representation.

DETAILED DESCRIPTION OF THE INVENTION

Figure 1:
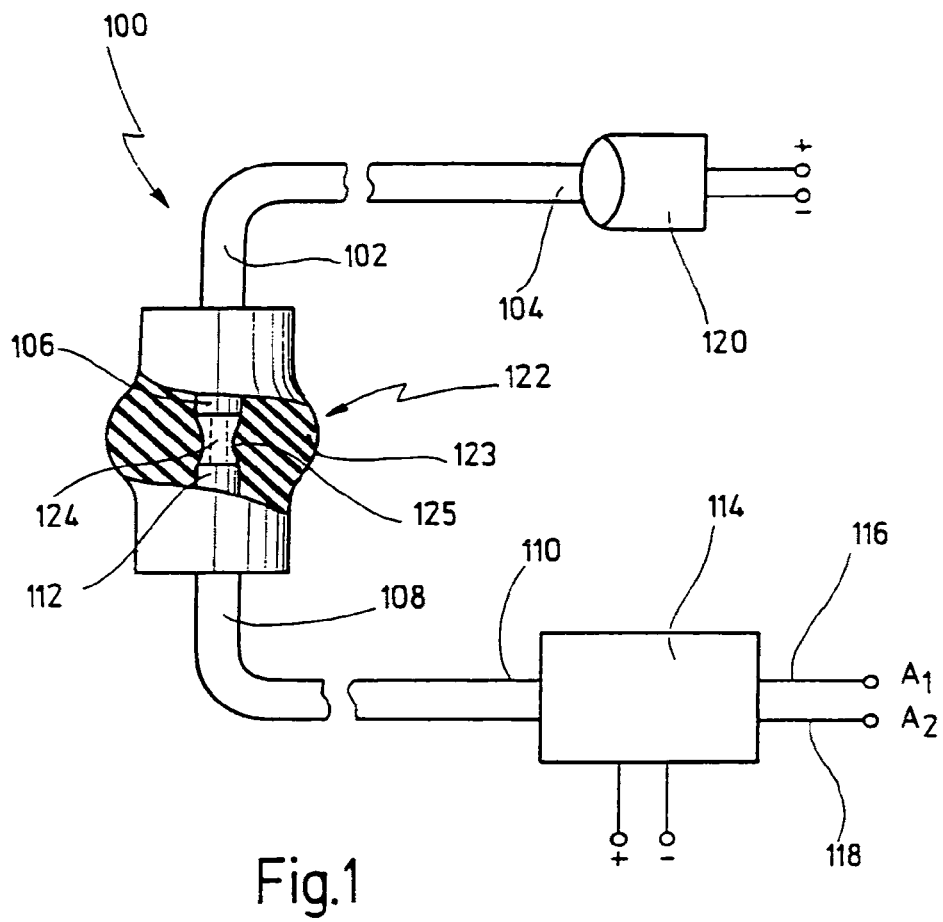
FIG. 1 shows a first embodiment of a control device according to the invention in a simplified representation denoting the principle.

In FIG. 1 a first embodiment of a control device according to the invention is designated in total with reference numeral 100.

The control device 100 comprises a first optical waveguide 102 which is configured as a transmitting waveguide, and further a second optical waveguide 108, which is configured as receiving waveguide. The receiving waveguide 102 comprises a first end 104 into which light from a light source 120, which may for instance be configured as LED, may be input.

A second end 106 of the receiving waveguide 102 is arranged at a small distance to an assigned second end 112 of the receiving waveguide 108. The first end 110 of the receiving waveguide 108 is connected to an evaluation circuitry 114 within which the light signals received from the receiving waveguide 108 are electronically evaluated to output independent therefrom output signals $A.sub.1$, $A.sub.2$ at output ports 116, 118.

The second ends 106, 112 of the optical waveguides 102, 108 are enclosed by a control element 122 which, in the embodiment shown, is configured as a rubber sleeve that firmly encloses the second ends 106, 112 and comprises a build-up 123 surrounding the middle. In the region between the second ends 106, 112 in FIG. 1 a light ray 124 is shown that enters from the transmitting waveguide 102 into the receiving waveguide 108. In addition, in the region between the second ends 106, 112, the rubber sleeve has a build-up or inner bead 125 that protrudes into the direction of the light ray 124. Since the control element 122 or the sleeve is rubber elastic, the build-up 123 can be gripped from the outside and be pressed together, so that the light ray 124 is interrupted. This is recorded by the evaluation circuitry 114 that outputs a respective output voltage at its output ports 116, 118. If the control device 100 shall be configured as a switch, then the evaluation circuitry 114 may comprise a relay or a semiconductor switch that opens (or closes) the output ports 116, 118, if the light signals received from receiving waveguide 108 fall below a certain threshold intensity.

Basically it is also possible to utilize the evaluation circuitry 114 for continuously evaluating the intensity of the light signals received for outputting independent thereof a continuous output signal or a digital output signal which may be a control signal.

FIG. 1a shows the application of the control device 100 according to FIG. 1 as a sensor by means of which the position of a clamping lever 134 of a power tool 130 is monitored.

The power tool 130 is shown in FIG. 1a only in the region of its gear head 132. The power tool 130 comprises the clamping lever 134 for clamping a tool. The clamping lever 134 can be pivoted between the open position shown in FIG. 1a and between a closed position in which the clamping lever 134 rests against the surface of the gear head 132. In this supporting region of the clamping lever 134 a control device 100 according to FIG. 1 is located. The two light waveguides 102, 108 are fixed on the top side of the gear head 132 by means of a plastic part 136 by clipping in a suitable position, so that the control element 122 is located in the supporting region of clamping lever 134.

Preferably the optical waveguides 102, 108 are configured as flexible optical waveguides and may be permanently deformed by local heating, so that desired bendings can be achieved. For instance, with waveguides of 2.2 mm thickness a 90 degree bending having a bending radius of 1 mm can be achieved. Herein light transmission is hardly not impaired. A distance between the second ends as small as possible is important for a good light transmission.

When the clamping lever 134 is closed, the control element 122 is pressed together, so that the light ray 124 is interrupted which is recorded by the evaluation circuitry 114.

In FIG. 1b a power tool 130 is shown in total.

Apart from the control device for controlling the position of the clamping lever 134 the power tool comprises three additional control devices of the embodiment according to FIG. 1 which are received on a rod-like housing 138.

In the case shown the power tool 130 is configured as an angle grinder which is configured for one-handed operation.

In the middle of housing 138 an oblong touch pad 148 is located by means which a control device configured as a switch 150 located there-below is actuable. The switch 150 can be activated by the ball of the thumb. It serves as a main switch for activating the motor of the power tool (dead man's switch). When the machine is gripped with the hand in the region of the touch pad 148, the machine is ready to start. Herein also the clamping lever 134 must be in its closed position so that the light ray is interrupted which is recorded by the optical non-locking key.

Switching on/off the machine is now possible by two finger non-locking keys 142, 146 located in the front region of both side faces of housing 138. They each operate an optical non-locking key, wherein for operating the power tool 130 only one of the two non-locking keys 142, 146 must be pressed. These non-locking keys 142, 146 are covered by a touch pad 140 or 144, respectively, which is made from rubber. The non-locking keys 142, 146 and the associated touch pads 140, 144 are made very soft, so that they can be permanently pressed during operation of the machine.

In this way a particularly ergonomic design of the power tool 130 is reached, that is not only suitable for right-handed operation, but also for left-handed operation, wherein also a position control for clamping lever 134 is ensured.

The optical waveguides may be located below the touch pads on the outer surface of housing 138, such as shown with respect to touch pad 140 (see FIG. 1c). When the housing 138 is composed of two shells, then the assembly is simplified by inserting all components into one shell. The rubber switch pads for the finger non-locking keys can be integrated into the housing as shown. At the same time thereby a noise attenuation is reached by rubberized inner walls, while locally rubberized outer surfaces allow for a better gripping comfort and ensure a vibration absorbing.

Herein by means of the light optical control device 100 located in the region of the gear head 132 which is made from metal, a position control for the clamping lever 134 is obtained in a particularly simple way without requiring costly insulation measures for obtaining contact safety in the region of the metallic gear head.

Figure 2:
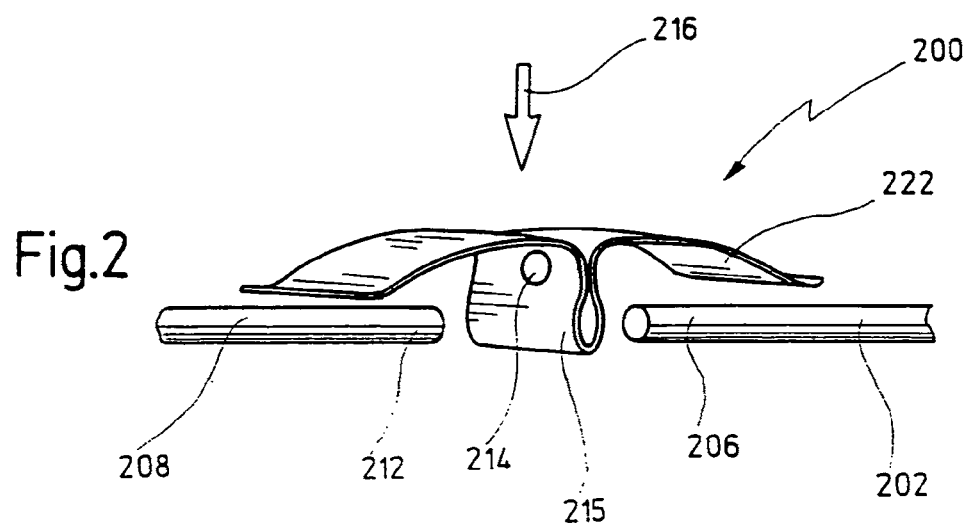
FIG. 2 shows a control device modified with respect to FIG. 1, wherein only the two ends of two waveguides and a control element having the form of a spring element assigned thereto are depicted.

A modification of the control device 100 is shown schematically in FIG. 2 and denoted in total with numeral 200. For ease of illustration the transmitting waveguide 202 and the receiving waveguide 208 are merely shown in the region of their second ends 206, 212. The control element 222 assigned thereto is configured as a formed spring having two lateral wings and a middle section 215 depending downwardly from the wings, that protrudes into the region between both ends 206, 212 and thus blocks a light ray, when in idle position. In the upper region of section 215 of control element 222 a light passing opening is provided in a suitable position which is moved between the two ends 206, 212 for passing light, when the control element 222 is pressed down into the direction of arrow 216.

In FIG. 2 as well as in subsequent Figures the remaining parts of the control device, such as the light source and the evaluation circuitry are not shown, for sake of simplicity.

The embodiment according to FIG. 2 can advantageously be applied as a non-locking key wherein a restoring can be reached by means of the spring force of the control element 222 or by means of the spring element.

Basically also in the idle position a light ray could be passed while it could be interrupted when the spring is pressed down.

In FIG. 2a a power tool taking the form of an angle grinder that utilizes such a control device 200 is depicted and denoted in total with numeral 230.

On housing 238 of the power tool 230 two non-locking keys 244, 248 are provided on opposite sides, both being covered by touch pads 242, 246. On the tool-facing end of the power tool 230 a gear head 232 made from metal is provided upon which a clamping lever 234 is attached pivotably, while again a non-locking key (not shown) is provided for monitoring the closed position of the clamping lever 234. All the optical waveguides are located on the outer side of the motor housing below a rubber surface 240. Thereby the waveguides are not collated in the air stream, so that there is no danger due to elevated temperatures. In the housing 238 a respective recess may be located for the optical waveguides, so that the rubber surface 240 that also includes the touch pads 242, 246 can be made flush with housing 238. The optical waveguides can also be located on the housing wall or on the inner side of the housing wall, whereby more space is made available for the cooling air stream.

In addition a third non-locking key may be located at the end of housing 238 opposite the rubber surface 240 intended for starting the device in two-handed operation. For switching on the power tool 230 selectively only one of the two non-locking keys 244, 248 or the third non-locking key (not shown) must be pressed. The non-locking keys pass a light signal when pressed. Thereby an activation of the power tool 230 is depressed in case of default, if the signal path is interrupted.

In addition the non-locking key for monitoring the clamping lever 234 must be activated to allow a starting of the power tool 230.

In FIGS. 3a)-3d) another modification of the control device according to the invention is depicted in total with numeral 300.

Herein the control device is configured as a so-called slide switch which is slidable from an idle position, shown in FIGS. 3a) and b), into an operative position, shown in FIGS. 3c) and d). FIGS. 3a) and 3c) are shown including touch pads, while in FIGS. 3b) and 3d) the touch pads are not shown.

To this end a transmitting waveguide 302 is received with second end 306 firmly in housing 318. The transmitting waveguide 302 cooperates with a receiving waveguide 308 that is aligned with the transmitting waveguide 306 while the second end 312 of the receiving waveguide 308 can be laterally displaced by means of the control element 322, configured as a slider, for interrupting the transmission of light signals into the receiving waveguide 308. The receiving waveguide 308, which is configured flexible, may be elastically biased to the top in the direction towards a slider 322 merely by means of its self-tension or by means of a spring element.

The slider 322 comprises an oblong form which is almost wedge-shaped and comprises at its end facing the transmitting waveguide 302 a locking surface 316 protruding downwardly which may be received for locking in a correspondingly formed recess 320 of housing 318. The slider 322 is firmly connected with a touch pad 314 located there-above and made from a rubber pad, which may, for instance, be obtained by application of two-component-molding-technology. When switching, that is when moving from the idle position shown in FIGS. 3a) and b) into the operative position, shown in FIGS. 3c) and d), thus by means of the touch pad 314 a bias is generated that restores the slider 322 again into its idle position upon release. During operation the operator must only overcome the restoring force by a soft pressing, while the main force is provided by the locking, when the locking surface 316 is locked into the recess 320.

For activation the slider 322 must only be shifted from its idle position according to FIGS. 3a) and b) by roughly two millimeters, until the locking surface 316 locks into the recess 320, and simultaneously, the second end 312 of the receiving waveguide 308 is aligned with the second end 306 of the transmitting waveguide 302.

Figure 3:
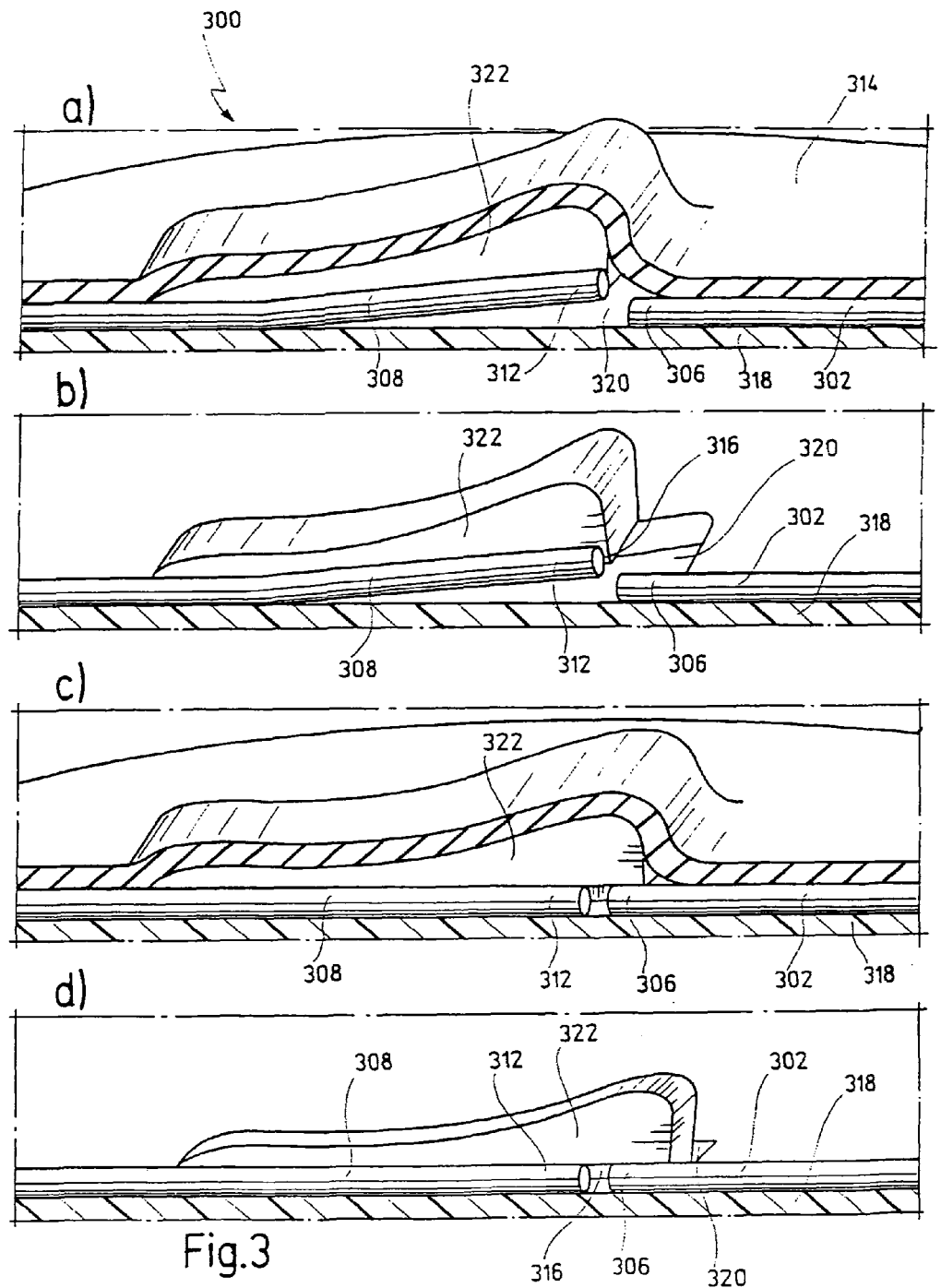
FIGS. 3a)-d) show an additional embodiment of a control device configured as a slide switch, shown in strongly enlarged, partially sectioned view.

In view of an embodiment as a push-button switch the embodiment according to FIG. 3 has the advantage that the holding force for holding the switch during operation can be designed independently from the force for activating the switch. Thus it is made possible to select the force for switching on relatively high to protect against inadvertent switching on, while keeping the holding force low, to thereby reach a higher operating comfort. Also a power tool that is equipped with such a slide switch cannot start when the housing is gripped, for instance, during transportation, by contrast, an intentional switching on is necessary.

Two further embodiments of the control device according to the invention which are configured as a ring switch are described in the following with reference to FIGS. 4 and 5.

The embodiment of the control device according to FIGS. 4 and 4a depicted in total with numeral 400 is an axial slide switch which is activatable by axially displacing the control elements 422, that is configured as a switching ring.

An annular transmitting waveguide 402 and an annular receiving waveguide 408 are received at a distance in an annular profile tube 410 which may, for instance, be made from rubber or another elastic material. Both optical waveguides 402, 408 are configured for a radial emission or a radial input, respectively.

In the idle position shown in FIG. 4a a light input from transmitting waveguide 402 into the receiving waveguide 408 is blocked by a protrusion 412 of profile tube 410 lying there-between. When the control element 422 or the switching ring, respectively, is axially displaced into the direction of the profile tube, then the profile tube is pressed together by an annular shoulder 424 of control element 422, thereby the protrusion 412 is pressed to the side, and both optical waveguides 402, 408 get into contact, so that light from the transmitting waveguide 402 is transmitted into the receiving waveguide 408.

Herein in addition a locking can be provided for the control element 422 for holding the control element 422 with a small holding force in the operative position. Upon release a restoring of the control element 422 into the idle position is reached due to the bias that is reached by the bulging of the profile tube 410.

Figure 4B:
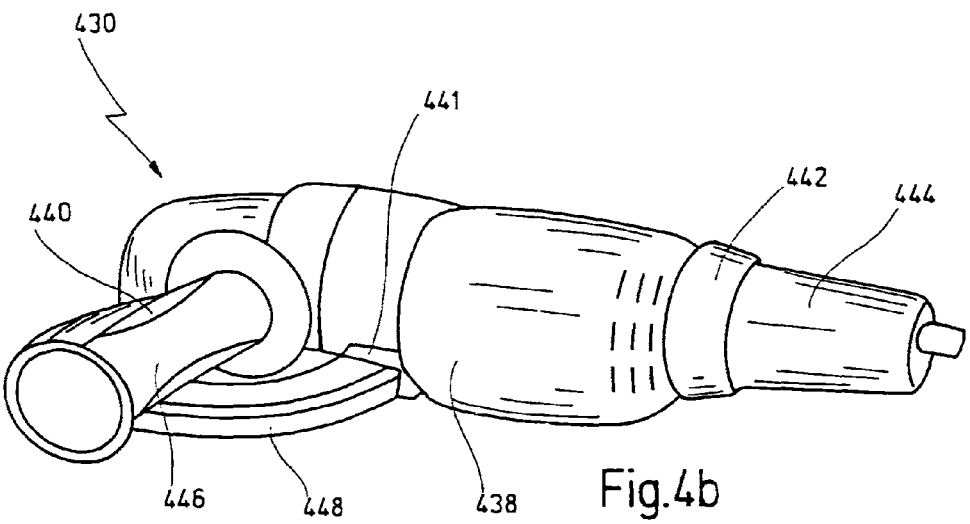
FIG. 4b shows a perspective view of a power tool comprising three control devices according to the invention.

In FIG. 4b a power tool that is configured as a two-handed angle grinder, is depicted in total with numeral 430.

The power tool 430 comprises an axial slide switch 442 that is designed according to FIG. 4 or 4a, respectively.

The power tool 430 is gripped with one hand at a rear gripping part 444 at the end of housing 438 and is held with the other hand by means of a stock handle 446 which may be attached on the left side of the gear head in the position shown in FIG. 4b.

At the stock handle 446 an additional control device 440 is provided which may, for instance, be designed according to FIG. 1 or 2. The control devices 440, 442 are designed for a two-handed operation, so that the power tool can be activated only when simultaneously gripping gripping part 444 and stock handle 446.

The two-handed angle grinder 430 is shown here in FIG. 4b also with a hood 448. The hood 448 cooperates with a control device 441 that can monitor whether the hood is attached or not, so that a start-up of the power tool 430 is only possible when the hood is attached. Herein also a coding of the hood may be provided to ensure that only a particular type of hood can be utilized for a particular power tool, while an activation of the power tool is not possible when a hood not suitable is attached.

The power tool 430 is configured for a two-handed operation, as mentioned before. Only when the ring switch 442 is activated, while simultaneously the switch 440 on stock handle 446 is activated with the other hand, a starting is possible. By means of the ring switch a switch activation is made possible in different gripping positions, so that also with different applications, such as roughing-down or separating, an activation of the switch is made possible in each gripping position.

A further embodiment of a control device according to the invention having annular optical waveguides is shown in FIGS. 5 and 5a and depicted in total with the numeral 500.

Herein an annular transmitting waveguide 502 comprises in total four defined light emerging positions 503, 504, 505, 506 that are angularly displaced to each other by 90 degrees each, and that cooperate with respective light input regions 509, 510, 511, 512 of an annular receiving waveguide 508 located on the inner side.

The light waveguides 502, 508 are supported by an annular housing 528, as can be seen from FIG. 5a. The control element 522 is configured as a ring having four switching surfaces 524 protruding laterally therefrom by means of which a rib 526 protruding from the control element 522 or the switching ring can be shifted into the respective interspace between the light emerging regions 503, 504, 505, 506 or the light input regions 509, 510, 511, 512, respectively, for blocking the light transmission.

In the upper part of FIG. 5a an activated position or operative position of the switch is shown, since the upper switching surface 524 is located outside the transmission region between transmitting waveguide 502 and receiving waveguide 508.

Further embodiments of the control device according to the invention which are configured as rotary switches are described in the following with reference to FIGS. 6 to 8.

In FIGS. 6 and 6a a control device according to the invention is depicted in total with numeral 600. On an annular housing 624 a control element 622 is received that is configured as a switching ring which is actuable by means of rotation. In the wall of housing 624 a transmitting waveguide 602 and a receiving waveguide 608 are supported. Herein the second end 606 of transmitting waveguide 602 is movable by means of control element 622 between a non activated position according to FIG. 6 in which the second end 606 is not aligned with the second end 612 of the receiving waveguide 608, and between an activated position or operative position, in which both ends 606, 612 are aligned with each other. The switching operation is effected by rotating the control element 622, whereby the second end 606 of the transmitting waveguide 602 is moved between the two positions shown in FIGS. 6 and 6a.

A further embodiment of a control device according to the invention is denoted in total in FIGS. 7 and 7a with numeral 700.

An annular control element 722 is supported on an annular housing 714, the control element being rotatable between a middle idle position and two operative positions by means of rotating into one direction of rotation or into the other direction of rotation.

In addition, the idle position is optically displayed by redirecting the light from the transmitting waveguide 702 onto an optical display 716, so that for instance a red dot shines when the power plug of the machine is connected. The switch is closed, when the control element 722 is rotated clockwise or anti clockwise, as will be explained in the following.

According to FIG. 7a a transmitting waveguide 702 and a receiving waveguide 708 are attached to housing 714 in a way not shown, so that their second ends 706, 712 are held adjacent each other, so that no light transmission there between is possible.

To effect a light transmission between the second ends 706, 712, a redirecting element is necessary that must be moved into a suitable position in front of the second ends 706, 712, so that the light emerging from the transmitting waveguide 702 is redirected into the receiving waveguide 708.

To this end on the inner side of control element 722 an insert 718 is received on which a first prism 724, followed by a redirecting element 720 and second prism 726 are supported adjacent each other.

While the middle redirecting element 720 allows to redirect a light ray emerging from the transmitting waveguide 702 to the outside onto the optical display 716, the two prisms 724, 726 are configured and arranged as such, that always when a prism 724 or 726 is located in front of the second ends 706, 712, the light emerging from transmitting waveguide 702 is redirected into the receiving waveguide 708.

Thus in the middle idle position shown in FIG. 7a the light emerging from transmitting waveguide 702 is redirected to the outside onto optical display 716 to thereby signal the activation of the control device or of a machine, e.g. an angle grinder, respectively, controlled thereby. When the control element 722 is rotated from its idle position either clockwise or anti clockwise, until one of the two prisms 724, 726 arrives in front of the second ends 706, 712 and redirects the light into the receiving waveguide 708. Then an activated position or operative position is reached in which the control element 722 must be held or can possibly be locked. When the control element 722 is released, it moves from each of the operative positions back into the middle position being idle position according to FIG. 7a.

To this end, the control element 722 is biased into the idle position by means of two spring elements 730, 732, which are shown in FIG. 7b exemplarily.

The control element 722 comprises an open switching ring 723 according to FIG. 7b, which may for instance be closed by a positive-fit metal clamp during assembly. The ring may be composed of a tape-formed supporting material, for instance from metal, that prevents an elongation of the ring and is molded from the outside with an elastic cover having several gripping recesses and two lateral rims 736, which are configured as sealing lips 738 for protecting the switching ring against contamination (FIG. 7c).

In FIG. 7b the still open switching ring 723 before molding is shown with respective spring elements 730, 732 located at its two ends 728, 734 facing each other.

The insert 718 on which the two lateral prisms 724, 726 and the middle redirecting element or redirecting prism 720 are received, may for instance be formed as a transparent molded part from PMMA.

Another modification of the control device according to the invention is shown in FIGS. 8 and 8a and depicted in total with numeral 800. To this end on a housing not shown again a transmitting waveguide 802 and a receiving waveguide 808 are arranged with their second ends 806, 812 beside each other, so that a light transmission is only possible, if a light ray emerging from transmitting waveguide 802 is redirected by means of a redirecting element into the receiving waveguide 808.

The control element 822 comprises a cap 829 made from an elastic material, such as rubber, that is firmly connected at a circumferential rim 825 with a housing opening not shown. Within the cap a slider 826 is received upon which two prisms 827, 828 are received adjacent each other.

According to FIG. 8 the control device 800 is in an idle position, in which light emerging from the transmitting waveguide 802 is deflected laterally by the prism 827 and cannot enter into the receiving waveguide 808.

From this idle position the control element 822 can either be displaced into one rotary direction, so that the position according to FIG. 8a is reached, in which light emerging from the transmitting waveguide 802 is redirected via the prism 827 into the receiving waveguide 808, or may be displaced into the opposite rotary direction into a second operative position (not shown).

In the second operative position the prism 828 is located in front of the second ends 806, 812 to redirect light from the transmitting waveguide 802 into the receiving waveguide 808.

Thus a switching device can be obtained in a simple way having a middle idle position and two lateral operative positions that can be reached from the idle position by rotating into one direction of rotation or by rotating into the opposite direction of rotation.

Herein the elasticity of the cap 829 made, for instance, from rubber can be utilized for providing a restoring force for biasing the control element 822 into the middle position, for instance.

Figure 8B:
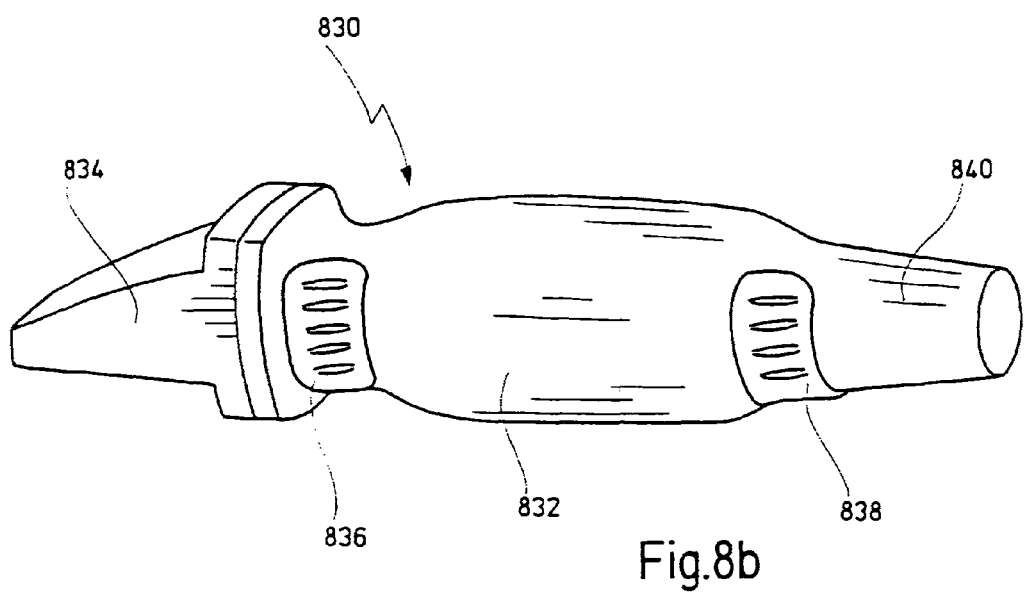
FIG. 8b shows a power tool comprising two control devices according to FIG. 8.

In FIG. 8b a power tool that is equipped with two of these control devices is depicted in total with numeral 830. Again it is configured as an angle grinder shown largely simplified that can be operated either one-handed or two-handed.

To this end at the front end of housing 832 at the transition to the gear head 834 a first rotary switch 836 according to FIG. 8 is provided, and at the rear end of housing 832 on a slim gripping part 840 a second rotary switch 838 is provided. The rear rotary switch 838 is configured for a two-handed operation, when the machine is gripped at its rear gripping part 840 and the rotary switch 838 is activated, while the machine is held simultaneously by means of a stock handle (not shown) with the second hand. The stock handle may be screwed into the gear head 834 on the left or right side. By contrast, the rotary switch 836 may be utilized for single-handed operation. To this end another rotary switch may be located on the opposite side which cannot be seen in FIG. 8b, so that the machine can be easily gripped from the left or from the right and can be activated simultaneously.

Figure 9:
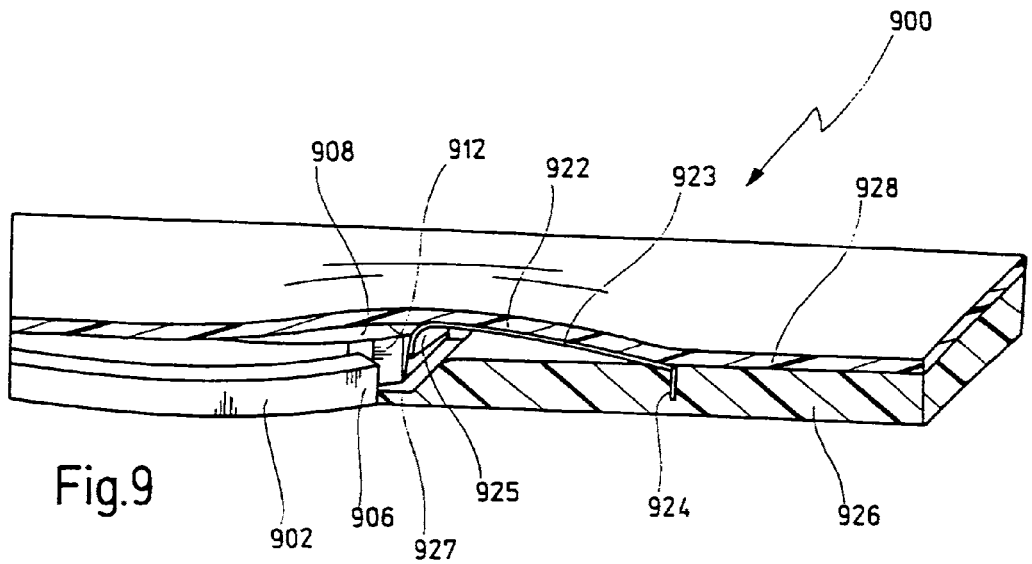
FIG. 9 shows a further embodiment of a control device according to the invention in considerably enlarged, partially sectioned representation.
Figure 9A:
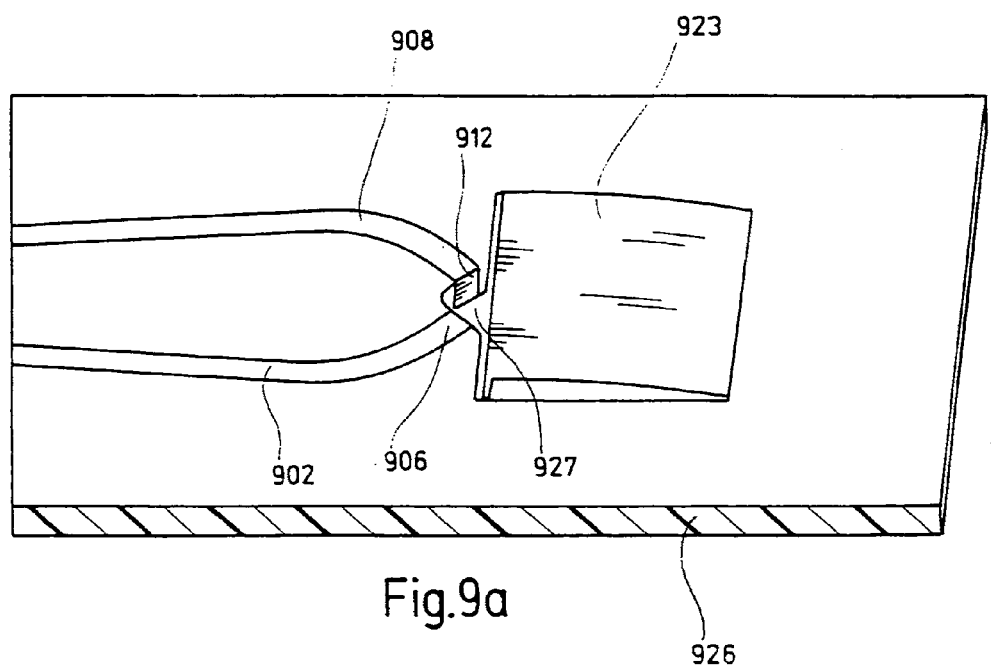
FIG. 9a shows a top view of the control device according to FIG. 9, after removal of the elastic touch pad arranged thereabove.

Another modification of the control device according to the invention is depicted in FIGS. 9 and 9a and denoted in total with numeral 900.

Herein a transmitting waveguide 902 and a receiving waveguide 908 are received on a housing 926, so that light emerging from the second end 906 of transmitting waveguide 902 can only be input into the second end 912 of the receiving waveguide by means of a respective redirecting element.

By contrast to the redirecting prisms utilized with the aforementioned embodiments, in the embodiment according to FIG. 9 a spring element 923 is provided that is clamped with one end 924 firmly in housing 926 and that is movable at its second end 925 against the action of its spring tension.

In housing 926 a recess 927 is provided so that the spring element 923 is movable with its second end 925 into a position in front of the second ends 906, 912 of the optical waveguides 902, 908. Since the second end 925 is metallized, for instance the spring element 923 may be formed from polished stainless steel, light emerging from the transmitting waveguide 902 is redirected into the receiving waveguide 908, when the second end 925 of the spring element 923 is located in front of the second ends 906, 912.

As can further be seen from FIG. 9, the spring element 923 of control element 922 is covered by a touch pad 928, that may preferably be made from an elastic material, such as rubber, and by which the spring element 923 is held in its idle position (no input of light signals into the receiving waveguide 908). When the touch pad 928 in the region of the spring element 923 is pressed down, then the spring element 923 is moved into its operative position, so that light from the transmitting waveguide 902 is redirected into the receiving waveguide 908. Upon release the spring element 923 moves to the outside under the action of its spring force while bulging the touch pad 928 to the outside.

Figure 9B:
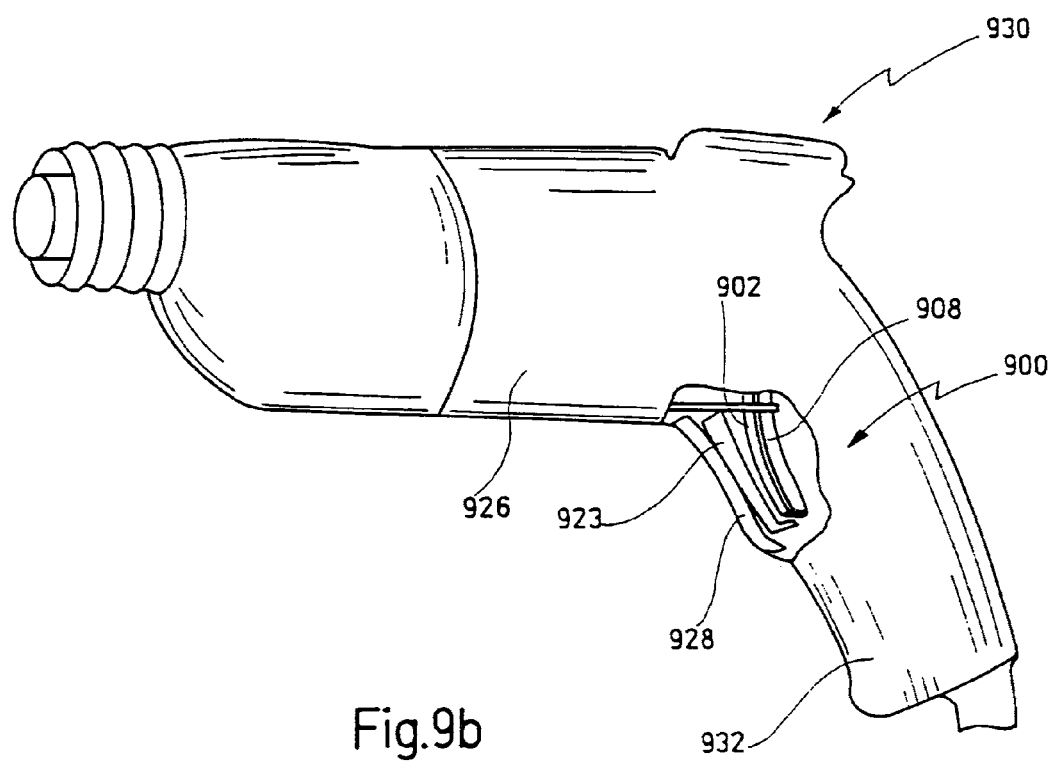
FIG. 9b shows a perspective view of a power tool in pistol form comprising a control device according to FIG. 9.

Such a control device 900 can advantageously be applied as a non-locking key that may be utilized for instance in a power tool 930 according to FIG. 9b. The power tool 930 is a drilling machine or a screw drive in pistol form which comprises a pistol hand grip 932 for activating a control device 900. If desired, the intensity of the light signals input into the receiving waveguide 908 may be evaluated continuously, so that the control device 900 can be utilized not only as a switch, but also as a controller, for instance to control the speed of the power tool 930.

In FIGS. 10, 10a, 10b a further embodiment of the control device according to the invention is depicted schematically and denoted in total with numeral 1000.

The control device 1000 largely corresponds to control device 900 according to FIG. 9, since again a transmitting waveguide 1002 and a receiving waveguide 1008 are arranged at an angle to each other, so that normally no transmission of light signals from the transmitting waveguide 1002 into the receiving waveguide 1008 is possible. To this end a redirecting element is necessary that is shown in FIGS. 10 and 10a schematically with numeral 1042. This redirecting element 1042 may have a metallized surface, however, in the present case already the embodiment of the surface as a white plastic part is sufficient, since the reflection is sufficient to input a light signal from the transmitting waveguide 1002 into the receiving waveguide 1008. The control element 1022 for moving this redirecting element 1042 may, as shown in FIG. 10a, comprise a touch pad 1040 which is connected to a housing 1038 by means of two-component molding technology and which acts onto the redirecting element 1042 located there below, for moving same against the action of a spring element 1044 into a position, in which the light signals from the second end 1006 of the transmitting waveguide 1002 are input into the second end 1012 of the receiving waveguide 1008.

The design of the touch pad in two-component-technology can better be seen from the enlarged representation according to FIG. 10b. The two-component-technology leads to a completely sealed touch pad 1040, so that the control element 1000 can be protected against environmental influences from outside (or also against contamination from inside).

A further embodiment of a control device according to the invention is schematically shown in FIG. 11 and denoted in total with numeral 1100. Into a transmitting/receiving waveguide 1102 light signals from a light source (not shown) are input, that emerge from one end 1128 of the transmitting/receiving waveguide 1102 and that are input again into the transmitting/receiving waveguide 1102 at a corresponding reflecting surface 1126. An evaluation of the light signals returned can be effected directly at the transmitting/receiving waveguide 1102 or in a separate receiving waveguide 1108 which is coupled with the transmitting/receiving waveguide 1102 by means of a beam splitter 1124 for decoupling a part of the light signals. In the region 1128 of the transmitting/receiving waveguide thus a single optical waveguide is sufficient to transmit the necessary light signals and to return them to the evaluating device. Such an embodiment may have advantages in particular under restrained spatial conditions. The control element 1122 my, for instance, be a non-locking key that is movable into the space between 1128 and the reflecting surface 1126.

If, due to design considerations, a reflecting surface 1126 should not be possible at the location shown in the drawing, then the control element 1122 may also serve as reflecting surface.

Figure 12:
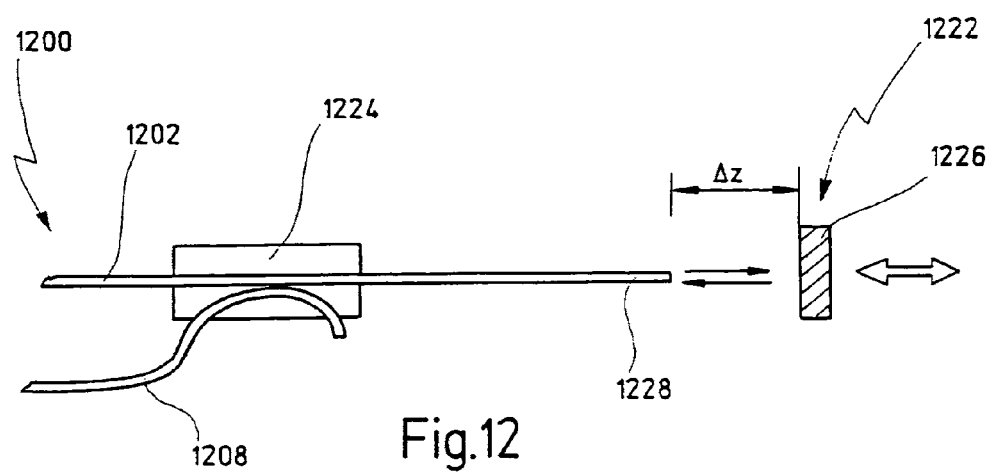

A modification of the embodiment according to FIG. 11 is shown in FIG. 12 and designated in total with numeral 1200.

Herein a frequency modulated light signal is input into a transmitting/receiving waveguide 1202 that emerges via an end 1228 of the transmitting/receiving waveguide 1202 and is reflected at a respective reflecting surface 1226. By varying the distance between the end 1228 and the reflecting surface 1226 a phase shift of the light signal returned to the end 1228 results. The evaluation is preferably done by means of a receiving waveguide 1208 which is coupled by means of a beam splitter 1224 and the output signal of which is input to an evaluation circuitry not shown. Herein the reflecting surface 1226 may be part of the control element 1222 which merely must be moved relative to the end 1228. The evaluation circuitry evaluates the path difference .DELTA.z. Thus the arrangement described can serve as a continuous controller.

What is claimed is:

1. A power tool comprising a housing;
a motor received within said housing for driving a tool;
at least two switch assemblies, each of said switch assemblies being configured as an optical control device for controlling activation of said motor, wherein each of said switch assemblies comprises:
a light source;
at least two optical waveguides, at least a first one of which being configured as a transmitting waveguide being coupled to said light source and cooperating with a second one of said optical waveguides, said second optical waveguide being configured as a receiving waveguide;
a control element being movable between at least two positions for controlling light input from said transmitting waveguide into said receiving waveguide; and
an evaluation circuitry coupled to said receiving waveguide for evaluating the light received by said receiving waveguide;
wherein said control element is covered by an elastic touch pad which is integrated into said housing; and
wherein said optical waveguides are located at least partially on an outer side of the housing, or in recesses formed within the housing.

2. The power tool of claim 1, wherein each of said switch assemblies is configured as an optically controlled switch.

3. The power tool of claim 1, wherein each of said switch assemblies is configured as an optically controlled non-locking key.

4. The power tool of claim 1, wherein at least one of said optical waveguides is integrated into a wall of said housing.

5. The power tool of claim 1, wherein said optical waveguides are movable between a position in which ends thereof are aligned with each other, and between a position in which said ends are not aligned with each other.

6. The power tool of claim 1, wherein ends of said optical waveguides are not aligned with each other, and wherein said control element comprises means for inputting light from said transmitting waveguide into said receiving waveguide, when being in at least one of said at least two positions of said control element.

7. The power tool of claim 6, wherein said means for inputting comprises a deflector for angularly deflecting light.

8. The power tool of claim 7, wherein said deflector comprises at least one reflecting surface.

9. The power tool of claim 7, wherein said deflector comprises prism.

10. The power tool of claim 1, wherein said touch pad has an elasticity, whereby said control element is biased into one of an idle position and an activated position.

11. The power tool of claim 1, wherein said elastic touch pad is received flush within said housing.

12. The control device of claim 1, wherein said control element comprises a redirecting means.

13. The control device of claim 12, wherein said redirecting means comprises at least one reflecting surface.

14. The power tool of claim 1, wherein said control device comprises a spring element which rests against said elastic touch pad.

15. The power tool of claim 1, wherein said elastic touch pad is integrated into said housing by a two-component-technology.

16. A self-contained power tool having at least one housing and at least two integral switch assemblies, each of said switch assemblies being configured as an optical control device for controlling operation of a motor thereof, each of said switch assemblies comprising:
a light source;
at least two optical waveguides, at least a first one of which being configured as a transmitting waveguide being coupled to said light source and cooperating with a second one of said optical waveguides, said second optical waveguide being configured as a receiving waveguide;
a control element being movable between at least two positions for controlling light input from said transmitting waveguide into said receiving waveguide; and
an evaluation circuitry coupled to said receiving waveguide for evaluating the light received by said receiving waveguide;
wherein each of said switch assemblies is integrally formed as part of said self-contained power tool;
wherein said control element is covered by an elastic touch pad which is integrated into said housing; and
wherein said optical waveguides are located at least partially on an outer side of the housing, or in recesses formed within the housing.

17. The self-contained power tool of claim 16, wherein each of said switch assemblies is configured as an optically controlled switch.

18. The self-contained power tool of claim 16, wherein each of said switch assemblies is configured as an optically controlled non-locking key.

19. The self-contained power tool of claim 16, wherein said elastic touch pad is integrated into said housing by a two-component-technology.

20. A power tool comprising
a housing;
a motor received within said housing for driving a tool;
at least two switching devices, each being configured as an optical control device for controlling activation of said motor, wherein each of said switching devices comprises:
a light source;
at least two optical waveguides, at least a first one of which being configured as a transmitting waveguide being coupled to said light source and cooperating with a second one of said optical waveguides, said second optical waveguide being configured as a receiving waveguide;
a control element being movable between at least two positions for controlling light input from said transmitting waveguide into said receiving waveguide; and
an evaluation circuitry coupled to said receiving waveguide for evaluating the light received by said receiving waveguide;

wherein each said control element is covered by an elastic touch pad; and wherein each of said elastic touch pads is integrated into said housing such that said elastic touch pads can be activated when gripping with one hand around said housing.

21. The power tool of claim 20, wherein each elastic touch pad is integrated into said housing by a two-component-technology.

* * * * *